United States Patent
Book

(10) Patent No.: US 7,078,068 B2
(45) Date of Patent: Jul. 18, 2006

(54) METHODS FOR COAGULATING COLLAGEN USING PHOSPHATE BRINE SOLUTIONS

(75) Inventor: Sharon L. Book, St. Louis, MO (US)

(73) Assignee: Astaris L.L.C., St. Louis, MO (US)

( * ) Notice: Subject to any disclaimer, the term of this patent is extended or adjusted under 35 U.S.C. 154(b) by 0 days.

(21) Appl. No.: 11/272,631

(22) Filed: Nov. 14, 2005

(65) Prior Publication Data

US 2006/0065876 A1    Mar. 30, 2006

Related U.S. Application Data

(63) Continuation-in-part of application No. 09/977,929, filed on Oct. 15, 2001, now abandoned.

(51) Int. Cl.
*A23L 1/31* (2006.01)
*A23L 1/315* (2006.01)
*A22C 13/00* (2006.01)
*A23B 4/10* (2006.01)
*C07K 1/02* (2006.01)

(52) U.S. Cl. .................. 426/140; 426/92; 426/105; 426/277; 426/305; 426/513; 426/516; 426/577; 426/641; 252/194; 252/184; 252/385; 252/383; 423/312; 530/356

(58) Field of Classification Search ............... None
See application file for complete search history.

(56) References Cited

U.S. PATENT DOCUMENTS

| 2,868,654 | A | | 1/1959 | Haynes et al. |
| 3,028,246 | A | | 4/1962 | Oliver et al. |
| 3,246,692 | A | * | 4/1966 | Metler et al. ............ 166/244.1 |
| 4,894,249 | A | | 1/1990 | Angermeier |
| 5,234,971 | A | | 8/1993 | Imai et al. |
| 5,271,948 | A | * | 12/1993 | Boni et al. .................. 426/278 |
| 5,554,401 | A | * | 9/1996 | Alexander et al. .......... 426/140 |
| 5,843,504 | A | * | 12/1998 | Kobussen et al. .......... 426/277 |
| 5,938,520 | A | * | 8/1999 | Scherch ...................... 452/177 |
| 5,997,919 | A | | 12/1999 | Kobussen et al. |
| 6,054,155 | A | | 4/2000 | Kobussen et al. |
| 6,153,234 | A | | 11/2000 | Kobussen et al. |

FOREIGN PATENT DOCUMENTS

WO    WO-9930568    6/1999

* cited by examiner

*Primary Examiner*—Joseph D. Anthony
(74) *Attorney, Agent, or Firm*—Thompson Coburn LLP

(57) ABSTRACT

Methods for coagulating collagen and producing a food product by contacting the collagen with a solution comprising at least about 40% by weight of a phosphate salt mixture wherein the phosphate salt mixture is comprised of at least two phosphate salts selected from the group consisting of monosodium phosphate, disodium phosphate, trisodium phosphate, monopotassium phosphate, dipotassium phosphate, and tripotassium phosphate.

27 Claims, No Drawings

METHODS FOR COAGULATING COLLAGEN USING PHOSPHATE BRINE SOLUTIONS

CROSS-REFERENCE TO RELATED APPLICATIONS

This application is a continuation-in-part application of U.S. patent application Ser. No. 09/977,929, filed on Oct. 15, 2001 now abandoned, which is hereby incorporated by reference herein in its entirety.

FIELD OF THE INVENTION

The invention relates to compositions and methods for producing brine solutions, phosphate salt mixtures, food products, and coagulating collagen.

BACKGROUND OF THE INVENTION

Salts have certain desirable properties when dissolved in a solvent. Salts may affect the pH, osmolality, osmolarity, partial pressure and other physical properties of a solution. Salts also vary in solubility. For example, ten grams of a certain salt may dissolve completely in 90 grams of water while ten grams of another salt will remain undissolved in 90 grams of water. A mixture of different salts may also have increased or decreased solubility when compared to the individual constituents of the mixture alone. Dry salts, or salts substantially free of water, also impart a more rapid drying response when contacted with a wet surface. It is believed that the disruption by salt molecules of the ionic, Van der Waals, hydrogen-bonding forces and other physical forces between solvent molecules allows for more rapid dissipation of solvent molecules from the solution. Likewise, certain salts in solution may quickly dry a wet surface, membrane, or substrate when the chemical interactions of the solution are changed.

These properties of salts have particular significance in the food industry. Salts have been used for thousands of years to season food, preserve food from bacterial growth, and to dry food and bind water. Many of these foods are prepared by adding a particular food product such as meat, cheese, and vegetable matter into a membrane which is congealed upon addition of a dry salt or salt solution. Certain salts are also known to coagulate, or congeal, a protein in solution or on the surface of food products. The term "coagulate" means to remove water from the protein solution. Sausages are but one product of this mode of food preparation.

The art of sausage making is an ancient craft encompassing a diverse range of products. There are many types of sausages including (1) ground, fresh sausage products, (2) emulsion-type sausages such as frankfurters, wieners, bologna, liver sausage, and other processed sausage products, and (3) fermented sausage products. The present invention has application to the manufacture of any type of sausage that is put into a casing. In addition, the compositions and methods can be used not only in the production of sausages, but may also be used in the production of other food products containing collagen, such as fish, meat, vegetables and cheese. The term food product shall hereinafter refer to any edible substance which can incorporate or become surrounded by collagen.

Food grade acids are commonly used in the manufacture of sausage products to spray product surfaces prior to smoking or cooking. The acid reduces surface pH and promotes coagulation of protein at the surface. Acetic acid or vinegar are used extensively. Liquid smoke, when sprayed, dipped, or atomized onto sausage surfaces, imparts flavor, improves color, and aids peeling in some instances.

Various binders/extenders are added to sausage meat formulations to improve emulsion stability, to improve cooking yields, to improve slicing characteristics, to improve flavor, and to reduce formulation costs. Binders/extenders, when utilized, are typically added in amounts up to 3.5%. Typical binders/extenders include cereal byproducts, starch, vegetable flour, soy flour, soy protein concentrate, soy protein isolate, hydrocolloids, sugars, nonfat dry milk, and calcium-reduced nonfat dry milk. Finally, sausage formulations contain salt (sodium chloride), and sometimes alkaline phosphates. Depending on the type of sausage product, salt may be present in an amount of from 0–5% of the final product weight.

As is well-known in the art, once all the ingredients have been ground and/or chopped, mixed, and emulsified, the resulting sausage batter may be transferred to stuffers for extruding the batter mix into casings. After the emulsion is stuffed in the casings, the encased mass may be tied with thread or fastened with metal clips. The stuffed and linked sausage products may then be transferred to a smoke house wherein the sausage products undergo a specialized drying and cooking operation in which the sausage emulsion is coagulated. After smoking and cooking, the product is showered with cold water and then chilled by refrigeration. Finally, after properly chilling the product, usually to a temperature of 35° F. to 40° F., casings may be removed by a peeling operation.

In modern sausage and other food product processors, such as those disclosed in U.S. Pat. No. 6,054,155 to Kobussen, et al., herein incorporated by reference in its entirety, the sausage filling is coextruded along with a collagen gel, which will form the casing. In order to form the casing, the collagen gel must be dehydrated and the collagen protein structure is altered in order to have the strength and functionality for further processing. This casing has the disadvantage of requiring a coagulation and air drying stages being costly in terms of energy consumption, length and inefficiency of drying times. The food product is simply prepared in too great a quantity and at too rapid a rate to allow for the traditional coagulation and drying steps. The coagulation and drying steps are enhanced by a brine solution. Specifically, the prior art salts do not meet all the needs of sausage manufacturers, such as those salts found in the Kobussen, et al. reference above.

Thus, what is needed are compositions and methods of decreasing the coagulation and drying times of the collagen by contacting it with a quick drying, high solubility and neutral pH salt solutions to enhance the coagulation process. What is also needed are compositions and methods which allow the combination of these two steps by the addition of a salt spray which both coagulates and dries the food product in a single step.

The invention will be described further in connection with the Example set forth below which is for purposes of illustration only. All percentages are by weight unless otherwise indicated.

BRIEF SUMMARY OF THE INVENTION

In overcoming the above disadvantages, it is an object of the invention to produce brine solutions and dry phosphate salt mixtures that may be used to coagulate collagen and reduce drying times of food products in contact with collagen.

Accordingly, and in one aspect of the invention, a brine solution comprising at least about 40% by weight of a phosphate salt mixture wherein the phosphate salt mixture is comprised of at least two phosphate salts selected from the group consisting of monosodium phosphate, disodium phosphate, trisodium phosphate, monopotassium phosphate, dipotassium phosphate, and tripotassium phosphate is provided.

In a second aspect of the invention, a dry phosphate salt mixture comprising at least two phosphate salts selected from the group consisting of monosodium phosphate, disodium phosphate, trisodium phosphate, monopotassium phosphate, dipotassium phosphate, and tripotassium phosphate is provided.

In a third aspect of the invention, a food product is provided comprising a brine solution comprising at least about 40% by weight of a phosphate salt mixture.

In a fourth aspect of the invention, a method of preparing a brine solution by combining a solvent and a salt mixture comprising at least about 40% by weight of a phosphate salt mixture is provided.

In a fifth aspect of the invention, a method of coagulating collagen comprising the steps of preparing a brine solution by combining a solvent and a salt mixture comprising at least about 40% by weight of a phosphate salt mixture and contacting the brine solution with collagen is provided.

In a sixth aspect of the invention, a method of preparing a food product comprising the steps of preparing a brine solution by combining a solvent and a salt mixture comprising at least about 40% by weight of a phosphate salt mixture, combining a food product with collagen, and contacting the brine solution with collagen and the food product is provided.

These and other objects, advantages, and features of the invention will become apparent to those persons skilled in the art upon reading the details of the compounds and methods more fully described below.

DETAILED DESCRIPTION OF THE INVENTION

It has been discovered that certain phosphate salt mixtures provide for both improved collagen coagulation and improved drying times when compared with other salts while at the same time providing high solubility and neutral pH. The term "high solubility" means a salt mixture that that is capable of forming high concentrations of salt in solution (e.g., at least about 40% by weight of a salt mixture in solution). The term "neutral pH" means a pH preferably between about 5.0 and about 9.0, and more preferably near about 7.0. A brine solution comprising the phosphate salt mixtures of the present invention having a pH of about 9.0 or less was determined to provide acceptable collagen coagulation and improved flavor than salt solutions with a pH greater than about 9.0. Specifically, at pH values greater than about 9.0 the brine solution tends to impart a "soapy" flavor to food products. Additionally, utilizing a solution having a neutral pH enhances workplace safety. Certain salts are able to dissociate in solution to provide high osmotic strength. The ortho-phosphates referred to herein all dissociate in solution to provide high osmotic strength. These characteristics of phosphate salts enable the collagen in contact with the food product to coagulate and form casing which can be further processed.

The phosphate salt mixtures of the invention are combinations of two or more of the following salts: monosodium phosphate, disodium phosphate, trisodium phosphate, monopotassium phosphate, dipotassium phosphate, and tripotassium phosphate. These particular salt mixtures mixed at a concentration of at least about 40% by weight of a phosphate salt mixture in a solution tend to provide high solubility, high osmality, neutral pH, and acceptable and preferably optimal coagulation when applied to collagen in contact with a food product.

These salts may also be mixed with both inorganic and organic acids to aid in coagulation and drying. Examples of inorganic acids include, but are not limited to hydrochloric, hydrobromic, hydroiodic, sulfuric and phosphoric. Organic acids may be selected, for example, from aliphatic, aromatic, carboxylic and sulfonic classes of organic acids. Examples of suitable organic acids include, but are not limited to formic, acetic, propionic, succinic, glycolic, glucoronic, maleic, furoic, glutamic, benzoic, anthranilic, salicylic, phenylacetic, mandelic, embonic (pamoic), methanesulfonic, ethanesulfonic, pantothenic, benzenesulfonic, stearic, sulfanilic, algenic and galacturonic acids.

Additionally, the salts may be mixed, or combined, with one or more food grade alkali compositions. Such alkali composition are included, primarily, to modify, control, or select the pH of the brine solution. Examples of such food grade alkali compositions include sodium hydroxide, potassium hydroxide, sodium hydrogen carbonate, sodium carbonate, and mixtures thereof. These particular compounds are commonly used to raise pH values in the manufacture or processing of food products.

The proportions of individual phosphate salts in the phosphate salt mixture depend, in large part, upon the solubility and pH of the resulting solution. Example 1 below provides particular examples of the preferred proportions of the invention.

EXAMPLE 1

Different phosphate salt mixtures were dissolved in water at room temperature. The percent salt (% Salt) is measured as the weight of the salt(s) divided by the weight of the entire solution after mixing. The weight of individual dry phosphate salt constituents were measured on a scale and mixed. After mixing each of the dry salt constituents, this dry phosphate salt mixture was added to a solvent and stirred thoroughly. The solvent may be aqueous, or comprise aliphatic or other carbon-based constituents. The following abbreviations apply to Tables 1 and 2 below: dipotassium phosphate (DKP), disodium phosphate (DSP), and monosodium phosphate (MSP). As can be seen by the first two examples of DKP alone in a solution, the pH remains unacceptably high. A high pH salt solution has been determined to be less than optimal when sprayed on collagen in contact with a food product.

Certain ratios of phosphate salts in solution, however, show more neutral pH while retaining high solubility. Thus, the salts below in Table 1 that provide a clear solution and high solubility upon Final Observation tend to be preferred over salts that appear opaque or hazy upon Final Observation. Salts below that have a pH of about 9.0 or less in solution are likewise preferred over salt mixtures that have a pH greater than about 9.0 in solution. The Initial Observation (Initial Observ.) was determined when stirring the mixture was completed. The Final Observation (Final Observ.) was determined 5 to 10 minutes after the Initial Observation. The total percentage by weight of all salts in the solution is designated in the Full % Salt column.

The brine solution preferably has a neutral pH without the addition of other buffer agents or pH modifiers such as an acid or base. However, the hydronium ion concentration may be altered by the addition of an acid where the pH is too high. Preferable acids are acetic acid, adipic acid, citric acid, nitric acid, phosphoric acid, and sulfuric acid.

(Weight Salt 1/Weight Salt 1 + Weight Salt 2) × 100
for two salt mixtures
and
(Weight Salt 1/Weight Salt 1 + Weight Salt 2 + Weight Salt 3) × 100
for three salt mixtures

TABLE 1

| Phosphate Salt Mixtures | % Salt | Full % Salt | Mass Salts (g) | Water (g) | pH | Initial Observ. | Final Observ. |
|---|---|---|---|---|---|---|---|
| DKP | 50 | 50 | 150 | 150 | 10.03 | Medium yellow haze | Clear |
| DKP | 50 | 50 | 150 | 150 | 9.95 | Medium yellow haze | Clear |
| DKP:DSP | 45:10 | 55 | 135.93:29.91 | 134.16 | 9.93 | Light yellow haze | Clear |
| DKP:DSP | 31:18 | 49 | 92.94:53.4 | 153.66 | 9.54 | Light yellow haze | Clear |
| DKP:MSP | 45:7 | 52 | 135:21 | 144 | 8.31 | Light yellow haze | Clear |
| DKP:DSP:MSP | 42:8:10 | 60 | 126:24:30 | 120 | 8.28 | Medium haze | Clear |
| DKP:DSP:MSP | 40:10:10 | 60 | 120:30:30 | 120 | 8.27 | Heavy haze | Clear |
| DKP:DSP:MSP | 42:6:12 | 60 | 126:18:12 | 120 | 8.03 | Light haze | Clear |
| DKP:DSP:MSP | 40:8:12 | 60 | 120:24:36 | 120 | 8.06 | Medium haze | Clear |
| DKP:DSP:MSP | 38:10:12 | 60 | 114:30:36 | 120 | 7.95 | Medium haze | Clear |
| DKP:DSP:MSP | 42:3:12 | 57 | 126:9:36 | 129 | 7.88 | Clear w/trace suspended particulates | Clear |
| DKP:MSP | 42:10 | 52 | 126:30 | 144 | 7.92 | Clear w/trace suspended particulates | Clear |
| DKP:MSP | 42:12 | 54 | 126:36 | 138 | 7.85 | Clear w/trace suspended particulates | Clear |
| DKP:MSP | 42:18 | 60 | 126:54 | 120 | 7.74 | Medium haze | Medium haze |
| DKP:MSP | 40:20 | 60 | 120:60 | 120 | 7.69 | Medium haze | Medium haze |
| DKP:DSP:MSP | 30:15:15 | 60 | 90:45:45 | 120 | 7.56 | Medium haze | Clear |

In addition, the preferred salt mixtures retain the more neutral pH when heated to 40° C. Other temperatures will be apparent to those skilled in the art. As can be seen by the first measurement, DKP alone retains an unacceptably high pH at 40° C., but certain phosphate salt mixtures provide more neutral pH at 40° C.

TABLE 2

| Phosphate Salt Mixtures At 40° C. | % Salt | Full % Salt | Mass Salts (g) | Water (g) | pH | Initial Observ. | Final Observ. |
|---|---|---|---|---|---|---|---|
| DKP | 50 | 50 | 150 | 150 | 9.28 | Light yellow haze | |
| DKP:MSP | 42:10 | 52 | 126:30 | 144 | 7.94 | Clear w/ trace suspended particulates | |
| DKP:MSP | 42:12 | 54 | 126:36 | 138 | 7.78 | Clear w/ trace suspended particulates | |

It will be understood by those skilled in the art that the % Salt figures may also be represented as percentages in the dry phosphate salt mixtures before dissolving in solution. For example, the 42%:10% DKP:MSP salt mixture in solution may also be represented as an 86.5%:13.5% dry DKP:MSP salt mixture. The equation to obtain the remaining dry phosphate salt mixture figures may be calculated by the following equations:

These equations may be easily carried out for four-or-more salt mixtures by adding the weights of the additional salts to the denominator. Therefore, where a dry phosphate salt percentage is represented, this means the weight of an individual salt component of the dry salt mixture compared to the weight of the entire dry salt mixture. The term dry means substantially free of water. Thus, a dry phosphate salt mixture is a mixture of two or more phosphate salts that is substantially free of water.

Food products were tested with several brine solutions with different mixtures and ratios of phosphate salts. It was determined that a neutral pH and high solubility of the phosphate salt mixture was determinative of more rapid collagen coagulation and drying rates.

Although preferred embodiments of the invention have been described in the foregoing Detailed Description of the Invention, it will be understood that the invention is not limited to the embodiments disclosed but is capable of numerous modifications without departing from the spirit and scope of the present invention.

What is claimed is:

1. A method of coagulating collagen comprising contacting the collagen with a brine solution that comprises a solvent and at least about 40% by weight of a phosphate salt mixture, wherein the phosphate salt mixture comprises at least two phosphate salts selected from the group consisting of monosodium phosphate, disodium phosphate, trisodium phosphate, monopotassium phosphate, dipotassium phosphate, and tripotassium phosphate.

2. The method of claim 1 wherein the solvent is water.

3. The method of claim 1 wherein the brine solution has a pH that is about 9.0 or less.

4. The method of claim 1 wherein the brine solution has a pH that is between about 5.0 and about 9.0.

5. The method of claim 1 wherein the brine solution further comprises an inorganic acid selected from the group consisting of nitric acid, hydrochloric acid, hydrobromic acid, hydroiodic acid, sulfuric acid, and phosphoric acid.

6. The method of claim 1 wherein the brine solution further comprises an organic acid selected from the group consisting of aliphatic, aromatic, carboxylic and sulfonic classes of organic acids.

7. The method of claim 6 wherein the organic acid is selected from the group consisting of formic, acetic, adipic, citric, propionic, succinic, glycolic, glucoronic, maleic, furoic, glutamic, benzoic, anthranilic, salicylic, phenylacetic, mandelic, embonic (pamoic), methanesulfonic, ethanesulfonic, pantothenic, benzenesulfonic, stearic, sulfanilic, algenic, and galacturonic acids.

8. The method of claim 1 wherein the brine solution further comprises a food grade alkali composition.

9. The method of claim 8 wherein the food grade alkali composition is selected from the group consisting of sodium hydroxide, potassium hydroxide, sodium hydrogen carbonate, sodium carbonate, and mixtures thereof.

10. The method of claim 1 wherein the brine solution comprises:
   a. dipotassium phosphate at a concentration that is between about 20 and about 40% by weight of the brine solution;
   b. disodium phosphate at a concentration that is between about 10 and about 30% by weight of the brine solution; and
   c. monosodium phosphate at a concentration that is between about 10 and about 30% by weight of the brine solution.

11. The method of claim 1 wherein the brine solution comprises:
   a. dipotassium phosphate at a concentration that is between about 33 and about 50% by weight of the brine solution;
   b. disodium phosphate at a concentration that is between about 1.5 and about 25% by weight of the brine solution; and
   c. monosodium phosphate at a concentration that is between about 5.5 and about 25% by weight of the brine solution.

12. The method of claim 1 wherein the brine solution comprises:
   a. dipotassium phosphate at a concentration that is between about 35 and about 60% by weight of the brine solution; and
   b. monosodium phosphate at a concentration that is between about 5 and about 40% by weight of the brine solution.

13. The method of claim 1 wherein the collagen is in contact with a food product.

14. The method of claim 13 wherein the food product is coextruded with the collagen.

15. A method of preparing a food product comprising:
   a. combining the food product with collagen; and
   b. contacting the combination of the food product and the collagen with a brine solution that comprises a solvent and at least about 40% by weight of a phosphate salt mixture, wherein the phosphate salt mixture comprises at least two phosphate salts selected from the group consisting of monosodium phosphate, disodium phosphate, trisodium phosphate, monopotassium phosphate, dipotassium phosphate, and tripotassium phosphate; wherein said contacting step results in the coagulation of said collagen.

16. The method of claim 15 wherein the solvent is water.

17. The method of claim 15 wherein the brine solution has a pH that is about 9.0 or less.

18. The method of claim 15 wherein the brine solution has a pH that is between about 5.0 and about 9.0.

19. The method of claim 15 wherein the brine solution further comprises an inorganic acid selected from the group consisting of nitric acid, hydrochloric acid, hydrobromic acid, hydroiodic acid, sulfuric acid, and phosphoric acid.

20. The method of claim 15 wherein the brine solution further comprises an organic acid selected from the group consisting of aliphatic, aromatic, carboxylic and sulfonic classes of organic acids.

21. The method of claim 20 wherein the organic acid is selected from the group consisting of formic, acetic, adipic, citric, propionic, succinic, glycolic, glucoronic, maleic, furoic, glutamic, benzoic, anthranilic, salicylic, phenylacetic, mandelic, embonic (pamoic), methanesulfonic, ethanesulfonic, pantothenic, benzenesulfonic, stearic, sulfanilic, algenic, and galacturonic acids.

22. The method of claim 15 wherein the brine solution further comprises a food grade alkali composition.

23. The method of claim 22 wherein the food grade alkali composition is selected from the group consisting of sodium hydroxide, potassium hydroxide, sodium hydrogen carbonate, sodium carbonate, and mixtures thereof.

24. The method of claim 15 wherein the brine solution comprises:
   a. dipotassium phosphate at a concentration that is between about 20 and about 40% by weight of the brine solution;
   b. disodium phosphate at a concentration that is between about 10 and about 30% by weight of the brine solution; and
   c. monosodium phosphate at a concentration that is between about 10 and about 30% by weight of the brine solution.

25. The method of claim 15 wherein the brine solution comprises:
   a. dipotassium phosphate at a concentration that is between about 33 and about 50% by weight of the brine solution;
   b. disodium phosphate at a concentration that is between about 1.5 and about 25% by weight of the brine solution; and
   c. monosodium phosphate at a concentration that is between about 5.5 and about 25% by weight of the brine solution.

26. The method of claim 15 wherein the brine solution comprises:
   a. dipotassium phosphate at a concentration that is between about 35 and about 60% by weight of the brine solution; and
   b. monosodium phosphate at a concentration that is between about 5 and about 40% by weight of the brine solution.

27. The method of claim 15 wherein the food product is coextruded with the collagen.

* * * * *